US011091652B2

(12) United States Patent
Mohmeyer et al.

(10) Patent No.: US 11,091,652 B2
(45) Date of Patent: Aug. 17, 2021

(54) COLD FLEXIBLE POLYURETHANE FORMULATION

(71) Applicant: BASF SE, Ludwigshafen am Rhein (DE)

(72) Inventors: Nils Mohmeyer, Ham (BE); Onno Graalmann, Lemfoerde (DE); Christof Grieser-Schmitz, Lemfoerde (DE); Andrea Eisenhardt, Lemfoerde (DE); Josep-Daniel Eslava, Rubi (ES)

(73) Assignee: BASF SE, Ludwigshafen am Rhein (DE)

( * ) Notice: Subject to any disclaimer, the term of this patent is extended or adjusted under 35 U.S.C. 154(b) by 160 days.

(21) Appl. No.: 16/480,373

(22) PCT Filed: Jan. 22, 2018

(86) PCT No.: PCT/EP2018/051435
§ 371 (c)(1),
(2) Date: Jul. 24, 2019

(87) PCT Pub. No.: WO2018/138048
PCT Pub. Date: Aug. 2, 2018

(65) Prior Publication Data
US 2019/0382592 A1 Dec. 19, 2019

(30) Foreign Application Priority Data

Jan. 25, 2017 (EP) .................. 17153114

(51) Int. Cl.
C09D 5/02 (2006.01)
C08G 18/16 (2006.01)
C08G 18/18 (2006.01)
C08G 18/24 (2006.01)
C08G 18/32 (2006.01)
C08G 18/38 (2006.01)
C08G 18/40 (2006.01)
C08G 18/42 (2006.01)
C08G 18/48 (2006.01)
C08G 18/50 (2006.01)
C08G 18/66 (2006.01)
C08G 18/76 (2006.01)
C08J 9/00 (2006.01)
C08J 9/12 (2006.01)
C08J 9/14 (2006.01)
C08K 5/521 (2006.01)
C09D 5/18 (2006.01)
C09D 175/12 (2006.01)
F17C 3/02 (2006.01)

(52) U.S. Cl.
CPC ........... *C09D 5/021* (2013.01); *C08G 18/165* (2013.01); *C08G 18/1808* (2013.01); *C08G 18/24* (2013.01); *C08G 18/3206* (2013.01); *C08G 18/3819* (2013.01); *C08G 18/4018* (2013.01); *C08G 18/4247* (2013.01); *C08G 18/482* (2013.01); *C08G 18/485* (2013.01); *C08G 18/4833* (2013.01); *C08G 18/5024* (2013.01); *C08G 18/6685* (2013.01); *C08G 18/7664* (2013.01); *C08J 9/0038* (2013.01); *C08J 9/125* (2013.01); *C08J 9/146* (2013.01); *C08K 5/521* (2013.01); *C09D 5/18* (2013.01); *C09D 175/12* (2013.01); *F17C 3/025* (2013.01); C08G 2110/0008 (2021.01); C08J 2203/182 (2013.01); C08J 2207/04 (2013.01); C08J 2375/12 (2013.01); F17C 2203/0333 (2013.01); F17C 2221/033 (2013.01); F17C 2270/0105 (2013.01)

(58) Field of Classification Search
CPC ........ C09D 5/021; C09D 5/18; C09D 175/12; C08G 18/165; C08G 18/1808; C08G 18/24; C08G 18/3206; C08G 18/3819; C08G 18/4018; C08G 18/4247; C08G 18/482; C08G 18/4833; C08G 18/485; C08G 18/5024; C08G 18/6685; C08G 18/7664; C08G 2110/0008; C08J 9/0038; C08J 9/125; C08J 9/146; C08J 2203/182; C08J 2207/04; C08J 2375/12; C08K 5/521; F17C 3/025; F17C 2203/0333; F17C 2221/033; F17C 2270/0105
See application file for complete search history.

(56) References Cited

U.S. PATENT DOCUMENTS 5,405,218 A 4/1995 Hyde-Smith
2012/0214891 A1 8/2012 Gehringer et al.
2013/0324632 A1 12/2013 Jacobmeier et al.

FOREIGN PATENT DOCUMENTS

DE 19654149 A1 6/1998
DE 10044712 A1 3/2002
(Continued)

OTHER PUBLICATIONS

International Search Report for International Application No. PCT/EP2018/051435, dated Mar. 26, 2018, 6 pages.
(Continued)

Primary Examiner — Robert S Walters, Jr.
(74) Attorney, Agent, or Firm — Armstrong Teasdale LLP

(57) ABSTRACT

Described herein are processes for producing cold-flexible polyurethane insulation, in which (a) polyisocyanates are mixed with (b) compounds having groups which are reactive to isocyanates, (c) blowing agents, (d) catalysts, (e) plasticizers and optionally (f) further additives to give a reaction mixture and the mixture is applied to a surface and cured to form insulation. Also described herein is a polyurethane insulation obtainable by a process described herein.

15 Claims, No Drawings

(56) References Cited

FOREIGN PATENT DOCUMENTS

| DE | 10156129 A1 | 5/2003 |
|---|---|---|
| EP | 1698649 A2 | 9/2006 |
| EP | 2208744 A1 | 7/2010 |
| EP | 2386585 A1 | 11/2011 |
| WO | 9005148 A1 | 5/1990 |
| WO | 9405718 A1 | 3/1994 |
| WO | 2008083996 A1 | 7/2008 |
| WO | 2010043624 A2 | 4/2010 |
| WO | 2011057999 A1 | 5/2011 |
| WO | 2011131682 A1 | 10/2011 |
| WO | 2012072540 A1 | 6/2012 |
| WO | 2012110585 A1 | 8/2012 |
| WO | 2012113737 A1 | 8/2012 |
| WO | 2013178623 A1 | 12/2013 |
| WO | 2014170316 A1 | 10/2014 |
| WO | 2015150304 A1 | 10/2015 |

OTHER PUBLICATIONS

European Search Report for EP Patent Application No. 17153114.8, dated Jul. 3, 2017, 7 pages.

COLD FLEXIBLE POLYURETHANE FORMULATION

CROSS-REFERENCE TO RELATED APPLICATIONS

This application is a U.S. National Phase Application of PCT/EP2018/051435, filed Jan. 22, 2018, which claims the benefit of priority to European Patent Application No. 17153114.8, filed Jan. 25, 2017, the entire contents of which are hereby incorporated by reference herein.

FIELD OF INVENTION

The present invention relates to processes for producing cold-flexible polyurethane insulation, in which (a) polyisocyanates are mixed with (b) compounds having groups which are reactive to isocyanates, (c) blowing agents, (d) catalysts, (e) plasticizers and optionally (f) further additives to give a reaction mixture and the mixture is applied to a surface and cured to form insulation, wherein isocyanates (a) and compounds (b) having groups which are reactive toward isocyanate, blowing agents (c), catalysts (d), plasticizers and optionally further additives (e) are reacted in such amounts that the isocyanate index is in the range 100-200, the compounds (b) having groups which are reactive toward isocyanates comprise at least one polyetherol (b1) having a nominal functionality of 4 or more, a proportion of propylene oxide, based on the total weight of alkylene oxide in the polyetherol (b1), of more than 60% by weight and an OH number of at least 300 mg KOH/g, at least one polyetherol (b2) having a nominal functionality of 3.5 or less, a proportion of primary OH groups of more than 50% and an OH number of less than 300 mg KOH/g, at least one polyesterol (b3) and chain extenders and/or crosslinkers (b4), the polyetherol (b2) comprises at least one polyetherol (b2a) having a nominal functionality of 3.5 or less, a proportion of ethylene oxide, based on the total weight of alkylene oxide in the polyol (b2a) of at least 80% by weight, a proportion of primary OH groups of more than 80% and an OH number of from more than 100 mg KOH/g to less than 300 mg KOH/g and at least one polyetherol (b2b) having a nominal functionality of 3.5 or less, a proportion of primary OH groups of more than 60% and an OH number of from more than 20 mg KOH/g to less than 80 mg KOH/g and wherein the water content, based on the total weight of the components (b) to (e), is less than 0.5% by weight. The present invention further relates to polyurethane insulation obtainable by a process according to the invention.

BACKGROUND

Apart from petroleum, natural gas is one of the most important energy sources of our time. Natural gas is ever more frequently being used as a relatively clean energy source in, inter alia, mobile transport means such as passenger cars, goods vehicles, aircraft or in particular on board ships. There, attempts are made, especially in densely populated regions such as port cities but also coastal waters such as the North sea and the Baltic sea, to dispense with the burning of heavy fuel oil, which at present is used as main energy source in shipping, and use natural gas as clean energy source. However, the high space requirement of natural gas under normal conditions is a problem here. Natural gas is therefore liquefied in order to reduce the space requirement. Since natural gas can be liquefied only at very low temperatures of about −160° C. and also has to be stored and transported at these temperatures, it is necessary to insulate the tanks as well as possible in order to keep the loss of liquefied gas by evaporation small.

Liquefied natural gas tanks are at present thermally insulated with, for example, perlite or insulation boards based on rigid polyurethane foams. Thus, insulation boards based on polyurethane and their use for the insulation of liquefied natural gas tanks on board ships are described, for example, in EP 1698649, WO 2008083996 and WO 2008/083996. These documents describe how the insulation panels are cut to size and adhesively bonded together with plywood sheets and resin-impregnated glass fiber mats. It is also stated that these elements are then used directly in construction of the tanks. A disadvantage of this method is that it is a complicated procedure. Furthermore, it cannot be employed in the retrofitting of the liquefied natural gas tanks since there is not sufficient space available.

DESCRIPTION

It was therefore an object of the invention to provide a polyurethane material which is suitable for insulating liquefied natural gas tanks, in particular on board ships, and can be installed simply. In particular, it was an object of the present invention to provide a method for insulating liquefied natural gas tanks in very confined places, for example in the retrofitting of such tanks on board ships. The polyurethane obtained should have particularly preferred properties at low temperatures and in particular have a high CTSR factor (cryogenic thermal stress resistance) in accordance with CINI (Committee Industrial Insulation).

The object of the invention has been achieved by a process for producing cold-flexible polyurethane insulation, in which (a) polyisocyanates are mixed with (b) compounds having groups which are reactive toward isocyanates, (c) blowing agents, (d) catalysts, (e) plasticizers and optionally (f) further additives to give a reaction mixture and the mixture is applied to a surface and cured to form insulation, wherein isocyanates (a) and compounds (b) having groups which are reactive toward isocyanate, blowing agents (c), catalysts (d), plasticizers and optionally further additives (e) are reacted in such amounts that the isocyanate index is in the range 100-200, the compounds (b) having groups which are reactive toward isocyanates comprise at least one polyetherol (b1) having a nominal functionality of 4 or more, a proportion of propylene oxide, based on the total weight of alkylene oxide in the polyetherol (b1), of more than 60% by weight and an OH number of at least 300 mg KOH/g, at least one polyetherol (b2) having a nominal functionality of 3.5 or less, a proportion of primary OH groups of more than 50% and an OH number of less than 300 mg KOH/g, at least one polyesterol (b3) and chain extenders and/or crosslinkers (b4), the polyetherol (b2) comprises at least one polyetherol (b2a) having a nominal functionality of 3.5 or less, a proportion of ethylene oxide, based on the total weight of alkylene oxide in the polyol (b2a) of at least 80% by weight, a proportion of primary OH groups of more than 80% and an OH number of from more than 100 mg KOH/g to less than 300 mg KOH/g and at least one polyetherol (b2b) having a nominal functionality of 3.5 or less, a proportion of primary OH groups of more than 60% and an OH number of from more than 20 mg KOH/g to less than 80 mg KOH/g and wherein the water content, based on the total weight of the components (b) to (e), is less than 0.5% by weight.

For the purposes of the present invention, polyisocyanate (a) is an organic compound which comprises at least two reactive isocyanate groups per molecule, i.e. the functionality is at least 2. If the polyisocyanates used or a mixture of a plurality of polyisocyanates do not have a uniform functionality, the number average of the functionality of the component a) used is at least 2. The average isocyanate functionality of the polyisocyanates a) is preferably at least 2.2 and particularly preferably from 2.2 to 4.

Possible polyisocyanates a) are the aliphatic, cycloaliphatic, araliphatic and preferably aromatic polyfunctional isocyanates known per se. Such polyfunctional isocyanates are known per se or can be prepared by methods known per se. The polyfunctional isocyanates can, in particular, also be used as mixtures, so that the component a) in this case comprises various polyfunctional isocyanates. Polyfunctional isocyanates which come into consideration as polyisocyanate have two (hereinafter referred to as diisocyanates) or more than two isocyanate groups per molecule.

In particular, specific mention may be made of: Alkylene diisocyanates having from 4 to 12 carbon atoms in the alkylene radical, e.g. dodecane 1,12-diisocyanate, 2-ethyltetramethylene 1,4,2-diisocyanate methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic polyisocyanates such as tolylene 2,4- and 2,6-diisocyanate and the corresponding isomer mixtures, diphyenylmethane 4,4'-, 2,4'- and 2,2'-diisocyanates and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates.

Particularly suitable polyisocyanates are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyldiphenyl diisocyanate, 1,2-diphenylethane diisocyanate and/or p-phenylene diisocyanate (PPDI), trimethylene, tetramethylene, pentamethylene, hexamethylene, heptamethylene and/or octamethylene diisocyanate, 2-methylpentamethylene-1,5-diisocyanate, 2-ethylbutylene-1,4-diisocyanate, pentamethylene-1,5-diisocyanate, butylene-1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), 1,4-cyclohexane diisocyanate, 1-methyl-2,4- and/or -2,6-cyclohexanediisocyanate and dicyclohexylmethane 4,4'-, 2,4'- and/or 2,2'-diisocyanate.

Use is frequently also made of modified polyisocyanates, i.e. products which are obtained by chemical reaction of organic polyisocyanates and have at least two reactive isocyanate groups per molecule. Particular mention may be made of polyisocyanates comprising ester, urea, biuret, allophanate, carbodiimide, isocyanurate, uretdione, carbamate and/or urethane groups, frequently also together with unreacted polyisocyanates.

The polyisocyanates of the component a) particularly preferably comprise 2,2-MDI or 2,4'-MDI or 4,4'-MDI (also referred to as monomeric diphenyl methane or MMDI) or oligomeric MDI, which consists of higher homologues of MDI having more than two rings, which have at least 3 aromatic rings and a functionality of at least 3, or mixtures of two or three of the abovementioned diphenyl methane diisocyanates, or crude MDI, which is obtained in the preparation of MDI, or preferably mixtures of at least one oligomer of MDI and at least one of the abovementioned low molecular weight MDI derivatives 2,2'-MDI, 2,4'-MDI or 4,4'-MDI (also referred to as polymeric MDI). The isomers and homologues of MDI are usually obtained by distillation of crude MDI.

Polymeric MDI preferably comprises one or more multiring condensation products of MDI having a functionality of more than 2, in particular 3 or 4 or 5, in addition to two-ring-MDI. Polymeric MDI is known and is frequently referred to as polyphenyl polymethylene polyisocyanate.

The (average) functionality of a polyisocyanate comprising polymeric MDI can vary in the range from about 2.2 to about 4, in particular from 2.4 to 3.8 and in particular from 2.6 to 3.0. Such a mixture of MDI-based polyfunctional isocyanates having different functionalities is, in particular, the crude MDI obtained as intermediate in the preparation of MDI.

Polyfunctional isocyanates or mixtures of a plurality of polyfunctional isocyanates based on MDI are known and are marketed, for example, by BASF Polyurethanes GmbH under the name Lupranat® M20 or Lupranat® M50.

The component (a) preferably comprises at least 70% by weight, particularly preferably at least 90% by weight and in particular 100% by weight, based on the total weight of the component (a), of one or more isocyanates selected from the group consisting of 2,2'-MDI, 2,4'-MDI, 4,4'-MDI and oligomers of MDI. Here, the content of oligomeric MDI is preferably at least 20% by weight, particularly preferably from more than 30% by weight to less than 80% by weight, based on the total weight of the component (a).

As compounds (b) having groups which are reactive toward isocyanates, it is possible to use all compounds which have at least two groups which are reactive to isocyanates, e.g. OH—, SH—, NH— and CH-acid groups. The compounds (b) having groups which are reactive toward isocyanates usually comprise polymeric compounds having groups which are reactive toward isocyanates and have from 2 to 8 hydrogen atoms which are reactive to isocyanate, e.g. polyether polyols and polyester polyols. Here, the molecular weight of the polyetherols and polyesterols is 300 g/mol or more, and chain extenders and crosslinkers have molecular weights of less than 300 g/mol.

The polyetherols are obtained by known methods, for example by anionic polymerization of alkylene oxides with addition of at least one starter molecule comprising from 2 to 8, preferably from 2 to 6, reactive hydrogen atoms in bound form, in the presence of catalysts. The nominal functionality of the polyetherols is therefore from 2 to 8, preferably from 2 to 6, and corresponds to the functionality of the starter molecules. If mixtures of starter molecules having different functionalities are used, fractional functionalities can be obtained. Influences on the functionality, for example due to secondary reactions, are not taken into account in the nominal functionality. As catalysts, it is possible to use alkali metal hydroxides such as sodium or potassium hydroxide or alkali metal alkoxides such as sodium methoxide, sodium or potassium ethoxide or potassium isopropoxide, or in the case of cationic polymerization it is possible to use Lewis acids such as antimony pentachloride, boron trifluoride etherate or bleaching earth as catalysts. Furthermore, double metal cyanide compounds, known as DMC catalysts, can also be used as catalysts.

As alkylene oxides preference is given to using one or more compounds having from 2 to 4 carbon atoms in the alkylene radical, for example tetrahydrofuran, 1,3-propylene oxide, 1,2- or 2,3-butylene oxide, in each case either alone or in the form of mixtures, and preferably ethylene oxide and/or 1,2-propylene oxide.

Possible starter molecules are, for example, ethylene glycol, diethylene glycol, glycerol, trimethylolpropane, pentaerythritol, sugar derivatives such as sucrose, hexitol derivatives such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and other dihydric or polyhydric alcohols or monofunctional or polyfunctional amines.

The polyester alcohols are usually prepared by condensation of polyfunctional alcohols having from 2 to 12 carbon atoms, for example ethylene glycol, diethylene glycol, butanediol, trimethylolpropane, glycerol or pentaerythritol, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the acids mentioned.

As further starting materials in the preparation of the polyesters, hydrophobic materials can also be concomitantly used. The hydrophobic materials are water-insoluble materials which comprise a nonpolar organic radical and also have at least one reactive group selected from among hydroxyl, carboxyl, carboxylic ester and mixtures thereof. The equivalent weight of the hydrophobic materials is preferably in the range from 130 to 1000 g/mol. It is also possible to use, for example, fatty acids such as stearic acid, oleic acid, palmitic acid, lauric acid or linoleic acid, and also fats and oils, for example castor oil, maize oil, sunflower oil, soybean oil, coconut oil, olive oil or tall oil. If polyesters comprise hydrophobic materials, the proportion of the hydrophobic materials based on the total monomer content of the polyester alcohol is preferably from 1 to 30 mol %, particularly preferably from 4 to 15 mol %.

Polyesterols here preferably have a functionality of from 1.5 to 5, particularly preferably from 1.8-3.5 and in particular from 1.9 to 2.2.

According to the invention, the compounds (b) having groups which are reactive toward isocyanates comprise at least one polyetherol (b1) having a nominal functionality of 4 or more, a proportion of propylene oxide, based on the total weight of alkylene oxide in the polyetherol (b1), of more than 60% by weight, preferably more than 80% by weight, particularly preferably more than 90% by weight and in particular 100% by weight, and a proportion of secondary OH groups of preferably more than 50%, particularly preferably more than 70%, more preferably more than 90% and in particular 100%, and an OH number of at least 300 mg KOH/g, preferably at least 400 mg KOH/g, at least one polyetherol (b2) having a nominal functionality of 3.5 or less, preferably from 2.0 to 3.5 and particularly preferably from 2.8 to 3.2, a proportion of primary OH groups of more than 50%, preferably more than 70% and particularly preferably more than 80%, and an OH number of less than 300 mg KOH/g, at least one polyesterol (b3) and chain extenders and/or crosslinkers (b4). As components (b1) to (b3) it is possible in each case to use individual compounds or mixtures, where each of the compounds used comes under the definition of (b1) to (b3).

The polyetherol (b1) has a proportion of propylene oxide, based on the total weight of alkylene oxide in the polyetherol (b1), of preferably more than 80% by weight, particularly preferably more than 90% by weight and in particular 100% by weight. The proportion of secondary OH groups is preferably more than 50%, particularly preferably more than 70%, more preferably more than 90% and in particular is 100%. The OH number of the polyetherol (b1) is preferably from 300 to 1000, particularly preferably from 400 to 800. In a preferred embodiment, a 4-functional amine, preferably ethylenediamine, is used as starter in the preparation of the polyetherol (b1).

The polyetherol (b2) comprises at least one polyetherol (b2a) having a nominal functionality of 3.5 or less, a proportion of ethylene oxide, based on the total weight of alkylene oxide in the polyol (b2a), of at least 80% by weight, preferably at least 90% by weight and in particular at least 100% by weight, a proportion of primary OH groups of more than 80% by weight, preferably more than 90% by weight and in particular 100% by weight, and an OH number of from greater than 100 mg KOH/g to less than 300 mg KOH/g and at least one polyetherol (b2b) having a nominal functionality of 3.5 or less, a proportion of propylene oxide, based on the total weight of alkylene oxide in the polyol (b2b), of preferably at least 50% by weight, particularly preferably from 60 to 90% by weight, a proportion of primary OH groups of more than 50%, preferably from 60 to 90%, and an OH number of from greater than 20 mg KOH/g to less than 80 mg KOH/g, preferably from greater than 25 mg KOH/g to less than 60 mg KOH/g and particularly preferably from greater than 30 mg KOH/g to less than 50 mg KOH/g.

The polyester polyol (b3) preferably has a functionality of from 2.0 to 2.5 and a hydroxyl number of from 100 mg KOH/g to 400 mg KOH/g, particularly preferably from 200 mg KOH/g to 300 mg KOH/g. The polyester polyol (b3) is preferably obtained by condensation of diacid with diol, with the diacid component preferably comprising an aromatic diacid. Particular preference is given to not using any further diacids apart from the aromatic diacid for the preparation of the polyester polyol (b3). Particular preference is given to using phthalic acid, isophthalic acid and/or terephthalic acid as diacid. The diol component preferably comprises diethylene glycol.

As chain extenders and/or crosslinkers (b4), particular preference is given to using bifunctional or trifunctional amines and alcohols, in particular diols, triols or both, in each case having molecular weights of less than 250 g/mol, preferably from 60 to 250 g/mol and in particular from 60 to 200 g/mol. Here, bifunctional compounds are referred to as chain extenders and trifunctional or higher-functional compounds are referred to as crosslinkers. Possibilities are, for example, aliphatic, cycloaliphatic and/or aromatic diols having from 2 to 14, preferably from 2 to 10, carbon atoms, e.g. ethylene glycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis-(2-hydroxyethyl)hydroquinone, triols such as 1,2,4-, 1,3,5-trihydroxycyclohexane, glycerol and trimethylolpropane, triethanolamine, low molecular weight hydroxyl-comprising polyalkylene oxides based on ethylene oxide and/or 1,2-propylene oxide and the abovementioned diols and/or triols as starter molecules and amines such as 3,6-dioxaoctamethylenediamine. Preference is given to using trifunctional alcohols such as glycerol and triethanolamine and diamines such as 3,6-dioxaoctamethylenediamine. The chain extender and/or the crosslinker (b4) preferably comprise at least one compound which has amine end groups.

The proportion of the component (b1) is preferably from 15 to 35% by weight, that of the component (b2) is preferably from 15 to 35% by weight, that of the component (b3) is preferably from 20 to 35% by weight and that of the component (b4) is preferably from 10 to 35% by weight, in each case based on the total weight of the component (b).

In a particularly preferred embodiment, the component (b) comprises less than 20% by weight, particularly preferably less than 10% by weight and in particular no, further compounds having groups which are reactive toward isocyanates in addition to the components (b1) to (b4). If isocyanate prepolymers are used as isocyanates (a), the content of compounds (b) having groups which are reactive to isocyanates is calculated with inclusion of the compounds (b) having groups which are reactive toward isocyanates used for the preparation of the isocyanate prepolymers.

Furthermore, blowing agents (c) are present in the production of the cold-flexible polyurethane insulation of the invention. As blowing agents (c), it is possible to use chemically acting blowing agents and/or physically acting compounds. For the purposes of the present invention, chemical blowing agents are compounds which form gaseous products, for example water or formic acid, by reaction with isocyanate. For the purposes of the present invention, physical blowing agents are compounds which are dissolved or emulsified in the starting materials for the production of polyurethane and vaporize under the conditions of polyurethane formation. These are, for example, hydrocarbons, halogenated hydrocarbons and other compounds such as perfluorinated alkanes, e.g. perfluorohexane, chlorofluorocarbons, and ethers, esters, ketones and/or acetals, for example (cyclo)aliphatic hydrocarbons having from 4 to 8 carbon atoms, fluorinated hydrocarbons such as Solkane® 365 mfc, or HFC 245-fa, or gases such as carbon dioxide. In a preferred embodiment, a physical blowing agent, preferably nonflammable physical blowing agent, is used as blowing agent. In particular, fluorinated hydrocarbons are used as blowing agents. These can comprise small amounts of chemical blowing agents, preferably water. Here, the proportion of water, based on the total weight of the components (b) to (e), is less than 0.5% by weight, preferably less than 0.2% by weight and in particular less than 0.1% by weight. The content of physical blowing agents is, in a preferred embodiment, in the range from 5 to 30% by weight, in particular from 10 to 25% by weight, based on the total weight of the components (b) to (e).

The blowing agent is used in such an amount that the density of the cold-flexible polyurethane insulation of the invention is preferably from 30 to 80 g/liter and particularly preferably from 50 to 70 g/liter.

As catalysts (d), it is possible to use all compounds which accelerate the isocyanate-water reaction or the isocyanate-polyol reaction. Such compounds are known and are described, for example, in "Kunststoffhandbuch, volume 7, Polyurethane", Carl Hanser Verlag, 3rd Edition 1993, Chapter 3.4.1. These comprise amine-based catalysts and catalysts based on organic metal compounds.

As catalysts based on organic metal compounds, it is possible to use, for example, organic tin compounds such as tin(II) salts of organic carboxylic acids, e.g. tin(II) acetate, tin(II) octoate, tin(II) ethylhexoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or alkali metal salts of carboxylic acids, e.g. potassium acetate or potassium formate.

Compounds comprising tertiary amines are usually employed as amine-based catalysts. These can also bear groups which are reactive to isocyanate, e.g. OH, NH or $NH_2$ groups. Some of the most frequently used catalysts are bis(2-dimethylaminoethyl) ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazol, N-ethylimidazol, tetramethylhexamethylenediamine, tris(dimethylaminopropyl)hexahydrotriazine, dimethylaminopropylamine, N-ethylmorpholine, diazabicycloundecene and diazabicyclononene.

A mixture comprising at least one tertiary amine and at least one catalyst based on organic metal compounds is preferably used as catalyst (d).

As plasticizers (e), mention may be made of, for example, esters of polybasic, preferably dibasic, carboxylic acids with monohydric alcohols. The acid component of such esters can, for example, be derived from succinic acid, isophthalic acid, terephthalic acid, trimellitic acid, citric acid, phthalic anhydride, tetrahydrophthalic and/or hexahydrophthalic anhydride, endomethylenetetrahydrophthalic anhydride, glutaric anhydride, maleic anhydride, fumaric acid and/or dimeric and/or trimeric fatty acids such as oleic acid, optionally in a mixture with monomeric fatty acids. The alcohol component of such esters can, for example, be derived from branched and/or unbranched aliphatic alcohols having from 1 to 20 carbon atoms, e.g. methanol, ethanol, propanol, isopropanol, n-butanol, sec-butanol, tert-butanol, the various isomers of pentyl alcohol, hexyl alcohol, octyl alcohol (e.g. 2-ethylhexanol), nonyl alcohol, decyl alcohol, lauryl alcohol, myristyl alcohol, cetyl alcohol, stearyl alcohol, and/or from naturally occurring fatty and wax alcohols or fatty and wax alcohols obtainable by hydrogenation of naturally occurring carboxylic acids. Possible alcohol components are also cycloaliphatic and/or aromatic hydroxy compounds, for example cyclohexanol and homologues thereof, phenol, cresol, thymol, carvacrol, benzyl alcohol and/or phenylethanol. Esters of monobasic carboxylic acids with dihydric alcohols, for example Texanol ester alcohols, for example 2,2,4-trimethyl-1,3-pentanediol diisobutyrate (TXIB) or 2,2,4-trimethyl-1,3-pentanediol dibenzoate; diesters of oligoalkylene glycols and alkyl carboxylic acids, for example triethylene glycol dihexanoate or tetraethylene glycol diheptanoate and analogous compounds, can also be used as plasticizers.

In addition, esters of the abovementioned alcohols with phosphoric acid are possible as plasticizers (e). Phosphoric esters derived from halogenated alcohols, e.g. trichloroethyl phosphate, can optionally also be used. In the latter case, a flame-retardant effect can be achieved at the same time as the plasticizer effect. Of course, it is also possible to use mixed esters of the abovementioned alcohols and carboxylic acids or phosphoric acids.

The plasticizers can also be polymeric plasticizers, e.g. polyesters of adipic acid, sebacic acid and/or phthalic acid.

Furthermore, alkylsulfonic esters of phenol, e.g. phenyl paraffin sulfonates, and aromatic sulfonamides, e.g. ethyltoluenesulfonamide, can also be used as plasticizers. It is also possible to use polyethers, for example triethylene glycol dimethyl ether, as plasticizers.

Furthermore, organic phosphates such as trischloropropyl phosphate (TCPP), diethyl ethanephosphonate (DEEP), triethyl phosphate (TEP), dimethyl propylphosphonate (DMPP), diphenyl cresyl phosphate (DPC) or triethyl phosphate, which are normally used as flame retardants, also have a plasticizing effect and can be used as plasticizers (e).

The plasticizer (e) preferably comprises organic phosphates, particularly preferably trischloropropyl phosphate and/or triethyl phosphate, preferably trischloropropyl phosphate and triethyl phosphate. Here, the weight ratio of trischloropropyl phosphate to triethyl phosphate is from 1:10 to 10:1, preferably from 1:5 to 2:1 and particularly preferably from 1:2 to 1:1. In a particularly preferred embodiment, no further plasticizer is used in addition to trischloropropyl phosphate and triethyl phosphate.

The plasticizer is preferably used in an amount of from 0.1 to 30% by weight, particularly preferably from 5 to 25% by weight and in particular from 10 to 20% by weight, based on the total weight of the components (b) to (e). The mechanical properties of the rigid polyurethane foam, especially at low temperatures, can be improved further by the addition of plasticizer.

As further additives (f), it is possible to use flame retardants, foam stabilizers, further fillers and other additives such as antioxidants.

As flame retardants, it is generally possible to use the flame retardants known from the prior art. Suitable flame retardants are, for example, brominated ethers (Ixol B 251), brominated alcohols such as dibromoneopentyl alcohol, tribromoneopentyl alcohol and PHT-4-diol and also chlorinated phosphates, e.g. the compounds tris(2-chloroethyl) phosphate, tris(2-chloroisopropyl) phosphate (TCPP), tris(1, 3-dichloroisopropyl) phosphate, tris(2,3-dibromopropyl) phosphate and tetrakis(2-chloroethyl) ethylenediphosphate, likewise acting as plasticizers, or mixtures thereof.

Apart from the abovementioned halogen-substituted phosphates, it is also possible to use inorganic flame retardants such as red phosphorus, preparations comprising red phosphorus, expandable graphite, aluminum oxide hydrate, antimony trioxide, arsenic oxide, ammonium polyphosphate and calcium sulfate or cyanuric acid derivatives such as melamine, or mixtures of at least two flame retardants, e.g. ammonium polyphosphates and melamine, and optionally starch, for making the rigid polyurethane foams produced according to the invention flame resistant.

As further liquid halogen-free flame retardants, it is possible to use diethyl ethanephosphonate (DEEP), triethyl phosphate (TEP), dimethyl propylphosphonate (DMPP), diphenyl cresyl phosphate (DPC) and others, which likewise have a plasticizing effect and can therefore also be used as plasticizers.

The flame retardants are preferably used in an amount of from 0 to 25%, based on the total weight of the components (b) to (e), for the purposes of the present invention. If organic phosphorus compounds are used as plasticizers, preference is given to using no further flame retardants.

For the purposes of the present invention, foam stabilizers are materials which promote the formation of a regular cell structure during foaming. Mention may be made by way of example of: Silicone-comprising foam stabilizers such as siloxane-oxyalkylene copolymers and other organopolysiloxanes. Additionally, alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol and also furthermore alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers.

Foam stabilizers are, if present, preferably used in an amount of from 0.5 to 4% by weight, particularly preferably from 1 to 3% by weight, based on the total weight of the components (b) to (e).

For the purposes of the present invention, further fillers, in particular reinforcing fillers, are the customary organic and inorganic fillers, reinforcing materials, etc., known per se. Specific examples are: inorganic fillers such as siliceous minerals, for example sheet silicates such as antigorite, serpentine, hornblends, amphiboles, chrysotile, talc; metal oxides such as kaolin, aluminum oxides, titanium oxides and iron oxides, metal salts such as chalk, barite and inorganic pigments such as cadmium sulfide, zinc sulfide and also glass and others. Preference is given to using kaolin (china clay), aluminum silicate and coprecipitates of barium sulfate and aluminum silicate and also natural and synthetic fibrous minerals such as wollastonite, metal fibers and in particular glass fibers of various lengths, which can optionally be coated with a size. Hollow glass microspheres can also be used. Possible organic fillers are, for example: carbon, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and in particular carbon fibers.

The inorganic and organic fillers can be used either individually or as mixtures and are, if present, advantageously incorporated in amounts of from 0.5 to 30% by weight, preferably from 1 to 15% by weight, based on the weight of the components (a) to (e), into the reaction mixture.

The reaction mixture is preferably applied by spraying to the surface to be insulated. The surface to be insulated is preferably a tank, particularly preferably a tank for liquefied natural gas. This can also consist of metal or plastic. For this purpose, the components (b) to (d) and optionally (e) are preferably mixed to give a polyol component. These are then preferably mixed with the isocyanate component (a) in a low-pressure mixing apparatus, a high-pressure mixing apparatus at a reduced pressure of less than 100 bar or a high-pressure machine and applied through a spray nozzle directly to the surface to be insulated. The surface can optionally be pretreated beforehand in a known manner in order to improve the adhesion, for example by application of known bonding agents.

Isocyanates (a) and compounds (b) having groups which are reactive toward isocyanate, blowing agents (c), catalysts (d), plasticizers and optionally further additives (e) are preferably reacted in such amounts that the isocyanate index is in the range from 100 to 200, preferably 100-150.

For the purposes of the present invention, the isocyanate index is the stoichiometric ratio of isocyanate groups to groups which are reactive toward isocyanate, multiplied by 100. For the present purposes, groups which are reactive toward isocyanate are all groups which are reactive toward isocyanate and are comprised in the reaction mixture, including chemical blowing agents but not the isocyanate group itself.

The present invention further provides polyurethane insulation obtainable by a process according to the invention. The polyurethane insulation of the invention is preferably used for insulating liquefied natural gas tanks on board ships, especially liquefied natural gas tanks on board ships which comprise liquefied natural gas for generating energy on board, and encompasses thermally insulated tanks, preferably liquefied natural gas tanks. The polyurethane insulation of the invention displays excellent cold flexibility; the CTSR factor (cryogenic thermal stress resistance) here is preferably at least 1.2, particularly preferably at least 1.5, both perpendicular to the foaming direction and also parallel to the foaming direction. Here, the CTSR factor is, for the purposes of the invention, determined as follows: (temperature range=−163 to 30° C.).

$$CTSR\text{-Factor} = \frac{\sigma_{ZT} \cdot (1 - \nu)}{E \cdot \alpha \cdot \Delta T}$$

$\sigma_{ZT}$=tensile strength in kPa at −165° C. in accordance with EN ISO 527
$\nu$=Poisson's ratio; negative ratio of a strain increase $\Delta\varepsilon n$ along one of the two axes perpendicular to the tensioning direction and the corresponding strain increase $\Delta\varepsilon l$ in the tensioning direction, measured within the initial linear part of the transverse strain/longitudinal strain curve
E=modulus of elasticity in kPa at −165° C. in accordance with EN ISO 527
$\alpha$=length change coefficient in mm/(mm·k) in accordance with DIN 53752
$\Delta T$=temperature difference (193 K)

Furthermore, the polyurethane insulation of the invention displays excellent thermal conductivities in accordance with EN 14320-1-C.3 both perpendicular and parallel to the foaming direction of preferably less than 0.0220 W/(m·k), particularly preferably 0.0210 W/(m·k) and in particular 0.0200 W/(m·k), measured after production of the foam at 10° C. (average temperature). After ageing, the thermal conductivity in accordance with EN 14320-1-C.4 or EN 14320-1-05 both perpendicular and parallel to the foaming direction is less than 0.0280 W/(m·k), preferably less than 0.024 W/(m·k) and in particular less than 0.0220 W/(m·k). The proportion of closed cells in accordance with EN ISO 4590 is preferably at least 90%, particularly preferably at least 94%. In addition, the polyurethane insulation of the invention has excellent compressive strengths at room temperature in accordance with EN ISO 826 of at least 0.3 N/mm², particularly preferably at least 0.4 N/mm² and in particular at least 0.5 N/mm² and tensile strengths in accordance with EN 527-2 at room temperature of at least 0.3 N/mm², particularly preferably at least 0.4 N/mm² and in particular at least 0.5 N/mm². At −165° C., the tensile strength in accordance with EN ISO 826 is at least 0.5 N/mm², particularly preferably at least 0.5 N/mm² and in particular at least 0.7 N/mm². The polyurethane insulation of the invention is thus outstandingly suitable for insulating liquefied natural gas tanks, for example on board vehicles, in particular for insulating liquefied natural gas tanks on board ships which comprise liquefied natural gas for generating energy on board.

The invention will be illustrated below with the aid of examples.

The CTSR factor and the thermal conductivity of the product are determined in the parallel direction and also in the perpendicular direction of foam growth. Large, multilayer foam blocks having dimensions of at least 800 mm (width)×800 mm (length)×300 mm (thickness) are prepared for this purpose. The following foam test specimens are to be cut from the foam core:

12 pieces each having dimensions of 80 mm×80 mm×200 mm (200 mm thickness in the parallel direction of foam growth) for determining the tensile strength and the modulus of elasticity at low temperature in the parallel direction of foam growth.

12 pieces having dimensions of 80 mm×80 mm×200 mm (200 mm thickness in the perpendicular direction of foam growth) for determining the tensile strength and the modulus of elasticity at low temperature in the perpendicular direction of foam growth.

2 pieces having dimensions of 50 mm×50 mm×150 mm (150 mm thickness in the parallel direction of foam growth) for determining the length change in the parallel direction of foam growth.

2 pieces having dimensions of 50 mm×50 mm×150 mm (150 mm thickness in the perpendicular direction of foam growth) for determining the length change in the perpendicular direction of foam growth.

2 pieces having dimensions of 200 mm×200 mm×35 mm (35 mm thickness in the parallel direction of foam growth) for determining the thermal conductivity in the parallel direction of foam growth.

2 pieces having dimensions of 200 mm×200 mm×35 mm (35 mm thickness in the perpendicular direction of foam growth) for determining the thermal conductivity in the perpendicular direction of foam growth.

To produce the rigid polyurethane foams according to the invention as per example 1 and comparative example C1, the isocyanate-reactive compounds were mixed as per table 1 with catalysts, stabilizer, plasticizer and blowing agent by stirring, subsequently mixed with the isocyanate and foamed to form the rigid polyurethane foam. The isocyanate index was in each case 125. The reaction mixture was then sprayed in a plurality of layers onto a substrate and allowed to cure, so that multilayer foam blocks having dimensions of at least 800 mm width×800 mm length×300 mm thickness are obtained.

The composition of the reaction mixture for producing the rigid polyurethane foams as per example 1 and comparative example C1 and the mechanical properties thereof are reported in table 1 (figures in parts by weight).

The procedure described above was followed for determining the mechanical properties.

TABLE 1

|  | Comparison 1 | Example 1 |
|---|---|---|
| Polyol 1 | 10.29 | 16.00 |
| Polyol 2 | 9.00 |  |
| Polyol 3 | 5.40 |  |
| Polyol 4 |  | 10.00 |
| Polyol 5 |  | 5.00 |
| Polyol 6 | 19.30 | 17.24 |
| Plasticizer 1 | 20.00 | 6.00 |
| Plasticizer 2 |  | 10.00 |
| Crosslinker 1 | 5.00 | 6.00 |
| Crosslinker 2 | 5.75 | 6.00 |
| Crosslinker 3 | 1.50 | 1.50 |
| Cat. 1 | 0.06 | 0.06 |
| Cat. 2 | 1.00 | 1.00 |
| Cat. 3 | 1.30 | 1.30 |
| Foam stabilizer 1 | 1.50 |  |
| Foam stabilizer 2 | 0.80 |  |
| Foam stabilizer 3 |  | 0.80 |
| Dispersant | 1.75 | 1.75 |
| Water | 0.05 | 0.05 |
| 1,1,1,3,3-Pentafluoroethane | 17.30 | 17.30 |
| Total | 100 | 100 |
| Iso 1 | 100.00 | 100.00 |
| Index | 125 | 125 |

TABLE 1-continued

|  | Comparison 1 | Example 1 |
|---|---|---|
| Raw density in accordance with DIN EN ISO 845 [g/l] | 64 | 65 |
| Compressive strength EN ISO 826 at room temperature [N/mm$^2$] | 0.47 | 0.54 |
| Tensile strength in accordance with EN 527-2 at room temperature [N/mm$^2$] | 0.53 | 0.49 |
| Tensile strength at −163° C. [N/mm$^2$] in accordance with EN ISO 826 | 0.56 | 0.74 |
| Content of closed cells [%] | 96 | 95 |
| Thermal conductivity at 10° C. (initial value [W/(m · K)], measured perpendicular to the foaming direction) | 0.0199 | 0.0200 |
| Thermal conductivity at 10° C. (after ageing [W/(m · K)], measured parallel to the foaming direction) | 0.0235 | 0.0228 |
| CTSR factor parallel to the foaming direction | <0.70 | 1.52 |
| CTSR factor perpendicular to the foaming direction | <0.70 | 1.56 |

The following starting materials were used here:
Polyol 1: Ethylenediamine-initiated propylene oxide; OH number 470
Polyol 2: Ethylenediamine-initiated propylene oxide; OH number 750
Polyol 3: Sorbitol-initiated propylene oxide, OH number 490
Polyol 4: Trimethylolpropane-initiated ethylene oxide, OH number 250
Polyol 5: Glycerol-initiated polyethylene oxide-co-propylene oxide (with ethylene end cap, OH number 35)
Polyol 6: Polyesterol based on phthalic acid, diethylene glycol and monoethylene glycol, OH number 240
Plasticizer 1: Trischloropropyl phosphate (TCPP)
Plasticizer 2: Triethyl phosphate
Crosslinker 1: Glycerol
Crosslinker 2: Triethanolamine
Crosslinker 3: 3,6-dioxaoctamethylenediamine
Cat.1: Tin catalyst
Cat.2: Tert. amine catalyst 1
Cat.3: Tert. amine catalyst 2
Foam stabilizer 1: Nonylphenol-based stabilizer
Foam stabilizer 2: Silicone-based stabilizer 1
Foam stabilizer 3: Silicone-based stabilizer 2
Dispersant: Oleic acid
Iso 1: Polymeric MDI

The invention claimed is:

1. A process for producing cold-flexible polyurethane insulation, in which
a) polyisocyanates are mixed with
b) compounds having groups which are reactive toward isocyanates,
c) blowing agents,
d) catalysts,
e) plasticizers and optionally
f) further additives
to give a reaction mixture and the mixture is applied to a surface and cured to form insulation, wherein polyisocyanates (a), compounds (b) having groups which are reactive toward isocyanates, blowing agents (c), catalysts (d), plasticizers (e) and optionally further additives (f) are reacted in such amounts that the isocyanate index is in a range from 100-200,
the compounds (b) having groups which are reactive toward isocyanates comprise at least one polyetherol (b1) having a nominal functionality of 4 or more, alkylene oxide having a proportion of propylene oxide, based on the total weight of alkylene oxide present in the at least one polyetherol (b1), of more than 60% by weight and an OH number of at least 300 mg KOH/g, at least one polyetherol (b2) having a nominal functionality of 3.5 or less, OH groups having a proportion of primary OH groups, based on the total number of OH groups present in the at least one polyetherol (b2), of more than 50% and an OH number of less than 300 mg KOH/g, at least one polyesterol (b3) and chain extenders and/or crosslinkers (b4),
the polyetherol (b2) comprises at least one polyetherol (b2a) having a nominal functionality of 3.5 or less, alkylene oxide having a proportion of ethylene oxide, based on the total weight of alkylene oxide present in the at least one polyetherol (b2a) of at least 80% by weight, OH groups having a proportion of primary OH groups, based on the total number of OH groups present in the at least one polyetherol (b2a), of more than 80% and an OH number of from more than 100 mg KOH/g to less than 300 mg KOH/g and at least one polyetherol (b2b) having a nominal functionality of 3.5 or less, OH groups having a proportion of primary OH groups, based on the total number of OH groups present in the at least one polyetherol (b2b), of more than 60% and an OH number of from more than 20 mg KOH/g to less than 80 mg KOH/g,
and wherein a water content in the reaction mixture, based on a total weight of the components (b) to (e), is less than 0.5% by weight.

2. The process according to claim 1, wherein ethylenediamine is used as a starter molecule in a preparation of the polyetherol (b1).

3. The process according to claim 1, wherein the at least one polyesterol (b3) has a nominal functionality of from 2 to 2.5 and a hydroxyl number of from 100 to 400 mg KOH/g.

4. The process according to claim 1, wherein the at least one polyesterol (b3) is obtained by condensation of a diacid component with a diol component, wherein the diacid component comprises an aromatic diacid and the diol component comprises diethylene glycol.

5. The process according to claim 1, wherein at least one compound of the chain extenders and/or crosslinkers (b4) has amine end groups.

6. The process according to claim 1, wherein the proportion of (b1) is from 15 to 35% by weight, that of (b2) is from 15 to 35% by weight, that of (b3) is from 20 to 35% by weight and that of (b4) is from 10 to 35% by weight, in each case based on a total weight of the compounds (b).

7. The process according to claim 1, wherein the compounds b comprise less than 20% by weight of further compounds having groups which are reactive toward isocyanates in addition to (b1) to (b4).

8. The process according to claim 1, wherein mixtures of monomeric diphenylmethane diisocyanate (MMDI) and multiring condensation products of diphenylmethane diisocyanate are used as polyisocyanates (a).

9. The process according to claim 1, wherein the further additives comprise from 5 to 25% by weight of flame retardants.

10. The process according to claim 9, wherein the flame retardants comprise triethyl phosphate.

11. The process according to claim 1, wherein the reaction mixture is applied to the surface by spraying.

12. The process according to claim 1, wherein a density of the polyurethane insulation is from 30 to 80 g/l and physical blowing agents are used as blowing agents.

13. A polyurethane insulation obtainable by a process according to claim 1.

14. A polyurethane insulation according to claim 13, wherein a CTSR (cryogenic thermal stress resistance) factor is greater than 1.5.

15. A method for insulating a liquefied natural gas tank on board a ship, the method comprising insulating the liquefied natural gas tank using the polyurethane insulation according to claim 13.

* * * * *